(12) United States Patent
Morito

(10) Patent No.: US 8,520,364 B2
(45) Date of Patent: Aug. 27, 2013

(54) MULTI-LAYER CERAMIC CAPACITOR

(75) Inventor: Kentaro Morito, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 28 days.

(21) Appl. No.: 13/443,167

(22) Filed: Apr. 10, 2012

(65) Prior Publication Data

US 2013/0100579 A1 Apr. 25, 2013

(30) Foreign Application Priority Data

Apr. 15, 2011 (JP) ................... 2011-090806

(51) Int. Cl.
*H01G 4/06* (2006.01)
(52) U.S. Cl.
USPC ............ 361/321.2; 361/321.1; 361/311; 361/313; 361/306.1; 361/306.3
(58) Field of Classification Search
USPC ............. 361/321.2, 321.1, 301.4, 303–305, 361/311–313, 309, 306.1, 306.3
See application file for complete search history.

(56) References Cited

U.S. PATENT DOCUMENTS

| | | | |
|---|---|---|---|
| 6,229,686 B1 * | 5/2001 | Shimahara et al. | 361/311 |
| 6,366,444 B1 | 4/2002 | Yagi | |
| 6,839,221 B2 * | 1/2005 | Sugimoto et al. | 361/321.2 |
| 7,206,187 B2 * | 4/2007 | Satou | 361/309 |
| 8,194,390 B2 * | 6/2012 | Kim et al. | 361/321.2 |
| 8,351,180 B1 * | 1/2013 | Ahn et al. | 361/321.2 |
| 8,456,799 B2 * | 6/2013 | Chang et al. | 361/321.2 |
| 2010/0025075 A1 | 2/2010 | Feichtinger et al. | |

FOREIGN PATENT DOCUMENTS

| | | |
|---|---|---|
| JP | 2000-277369 A | 10/2000 |
| JP | 2002-15939 A | 1/2002 |
| JP | 2002-170736 A | 6/2002 |
| JP | 2009-32833 A | 2/2009 |
| JP | 2010-518651 A | 5/2010 |
| JP | 2011-23707 A | 2/2011 |

OTHER PUBLICATIONS

Japanese Office Action dated Jan. 24, 2013, in a counterpart Japanese patent application No. 2011-090806.
Japanese Office Action dated Nov. 6, 2012, in a counterpart Japanese patent application No. 2011-090806. (Concise Explanation of Relevance: the Japanese Office Action rejects claims in the Japanese application in view of Foreign Patent document Nos. 1-3 above.).

* cited by examiner

*Primary Examiner* — Nguyen T Ha
(74) *Attorney, Agent, or Firm* — Chen Yoshimura LLP

(57) ABSTRACT

An object of the present invention is to provide a multi-layer ceramic capacitor that includes a laminated block 4 formed by laminating ceramic dielectric layers 2 and internal electrodes 3 alternately, a pair of cover layers 5 laminated on top and bottom of the laminated block, a ceramic body 6 formed on both side surfaces of the laminated block 4, and a pair of external electrodes 7 electrically connected to the internal electrodes 3 and that can effectively prevent an occurrence of a crack. In the multi-layer ceramic capacitor 1, a silicate crystal made of an oxide including Ba and Si or a silicate crystal made of an oxide including Ti and Si is formed in boundary portions between the laminated block 4 and the ceramic bodies 6.

4 Claims, 2 Drawing Sheets

MULTI-LAYER CERAMIC CAPACITOR

The present application claims priority to Patent Application No. 2011-090806 filed in Japan on Apr. 15, 2011 under the Paris Convention and provisions of national law in a designated State. The entire contents of which are hereby incorporated by reference.

TECHNICAL FIELD

The present invention relates to a multi-layer ceramic capacitor, and more particularly, to a multi-layer ceramic capacitor that can effectively prevent an occurrence of a crack.

BACKGROUND ART

A multi-layer ceramic capacitor is typically manufactured through a step of preparing a ceramic green sheet, a step of forming an internal electrode layer by printing conductive paste in a desired pattern on this ceramic green sheet, a step of making a laminated block by stacking and pressure-bonding a plurality of ceramic green sheets respectively having the internal electrode layers, a step of making unfired chips by cutting the laminated block to a prescribed size, a step of firing the unfired chips to obtain chip elements, a step of forming external electrodes by baking conductive paste applied on both end surfaces of the chip elements, and a step of plating the external electrodes with a metal such as nickel, tin, or the like.

However, in manufacturing a multi-layer ceramic capacitor in the manner described above, it is difficult to stack and pressure-bond the plurality of ceramic green sheets so that adjacent internal electrodes face each other precisely. This results in a problem of not being able to increase the capacitance of the capacitor sufficiently due to the adjacent internal electrodes on the ceramic green sheets not precisely facing each other.

To solve this problem, Japanese Patent Application Laid-Open Publication No. 2011-23707 (Patent Document 1), for example, discloses the following method of manufacturing a multi-layer ceramic capacitor: forming internal electrodes by printing conductive paste for the internal electrodes on the entire surface of a substantially rectangular ceramic green sheet except for an area near at least one side thereof; forming a laminated block by stacking a plurality of ceramic green sheets having the internal electrodes; pressure-bonding the laminated block by applying a high pressure; cutting the laminated block to a required size; forming, by coating or the like, ceramic bodies that later become portions referred to as side margins on both side surfaces of the laminated block where the internal electrodes are exposed, thereby making a ceramic green chip; and firing the ceramic green chip after performing a binder removal process.

RELATED ART DOCUMENTS

Patent Documents

Patent Document 1: Japanese Patent Application Laid-Open Publication No. 2011-23707

SUMMARY OF THE INVENTION

Problems to be Solved by the Invention

However, in contrast to the laminated block that has been pressure-bonded with application of a high pressure, the ceramic bodies are formed only by coating or the like to both side surfaces of the laminated block. This causes the laminated block and the ceramic bodies (side margins) to have different properties, resulting in a problem of lowering the strength and the durability of the multi-layer ceramic capacitor.

The multi-layer ceramic capacitor manufactured in the manner described above has a problem in that, when the multi-layer ceramic capacitor is attached to a substrate by reflow soldering under a high temperature atmosphere, for example, stress is generated because of a difference in the thermal expansion coefficient between the metal that forms the internal electrodes and the ceramic bodies, and therefore, the multi-layer ceramic capacitor becomes likely to have a crack.

In Japanese Patent Application Laid-Open Publication No. 2011-23707 (Patent Document 1), hetero-phase regions are formed in end portions of the internal electrode layer on the sides of both end surfaces of the multi-layer ceramic capacitor where the ceramic bodies (side margins) are formed. However, this is for sufficiently suppressing deterioration of insulation resistance of the multi-layer ceramic capacitor, and the hetero-phase domains do not prevent an occurrence of a crack after firing in the multi-layer ceramic capacitor having the ceramic bodies.

The same problem existed in a multi-layer ceramic capacitor manufactured by various other known methods; methods other than the method disclosed in Japanese Patent Application Laid-Open Publication No. 2011-23707 (Patent Document 1).

Thus, it is an object of the present invention to provide a multi-layer ceramic capacitor that can effectively prevent an occurrence of a crack.

The inventor of the present invention conducted a thorough study to achieve the object of the present invention, and as a result, found the following: by forming a silicate crystal made of an oxide including Ba and Si or a silicate crystal made of an oxide including Ti and Si in a boundary portion between the laminated block and the ceramic body, adhesion between the laminated block and the ceramic body is improved, and an occurrence of a crack can therefore be prevented.

The present invention was made in view of such findings, and additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a multi-layer ceramic capacitor including a laminated block formed by laminating a ceramic dielectric layer and an internal electrode alternately, a pair of cover layers laminated on top and bottom of the laminated block, a ceramic body formed on both side surfaces of the laminated block, and a pair of external electrodes electrically connected to the internal electrode, wherein a silicate crystal made of an oxide including Ba and Si or a silicate crystal made of an oxide including Ti and Si is formed in a boundary portion between the laminated block and the ceramic body.

In the present invention, the silicate crystal made of an oxide including Ba and Si or the silicate crystal made of an oxide including Ti and Si is formed in the boundary portions between the laminated block and the ceramic bodies in a manner described below, for example.

As a dielectric that forms the ceramic body, a dielectric material having a higher glass component content as compared with the ceramic dielectric layer that constitutes the laminated block is prepared. A conductive paste is prepared by adding $BaTiO_3$ as an additive to a conductive paste for the internal electrode including nickel. When unfired chips formed of these materials are fired, in a process of increasing a temperature in the firing step, liquid phase is formed in the ceramic body by the glass component, and $BaTiO_3$ that has been added as the additive is released from the internal electrode layers. $BaTiO_3$ released from the internal electrode layers reacts with the liquid phase in the ceramic body, thereby forming the silicate crystal made of an oxide including Ba and Si or the silicate crystal made of an oxide including Ti and Si in the boundary portion between the laminated block and the ceramic body. This strengthens the adhesion between the laminated block and the ceramic body, and as a result, an occurrence of a crack can be effectively prevented.

The object of the present invention is also achieved by a manufacturing method of a multi-layer ceramic capacitor including a laminated block formed by laminating ceramic dielectric layers and internal electrodes alternately, a pair of cover layers laminated on top and bottom of the laminated block, a ceramic body formed on both side surfaces of the laminated block, and a pair of external electrodes electrically connected to the internal electrodes, wherein a silicate crystal made of an oxide including Ba and Si or a silicate crystal made of an oxide including Ti and Si is formed in a boundary portion between the laminated block and the ceramic body.

In the present invention, it is preferable that the silicate crystal made of an oxide including Ba and Si or the silicate crystal made of an oxide including Ti and Si be $Ba_2TiSi_2O_7$, for example.

In the present invention, it is also preferable that the average grain size of $BaTiO_3$ added to the conductive paste for the internal electrode including nickel be less than 100 nm.

Effects of the Invention

According to the present invention, it becomes possible to provide a multi-layer ceramic capacitor that has the improved adhesion between the laminated block and the ceramic body and that can therefore effectively prevent an occurrence of a crack.

It is to be understood that both the foregoing general description and the following detailed description are exemplary and explanatory, and are intended to provide further explanation of the invention as claimed.

DETAILED DESCRIPTION OF EMBODIMENTS

Figure 1:
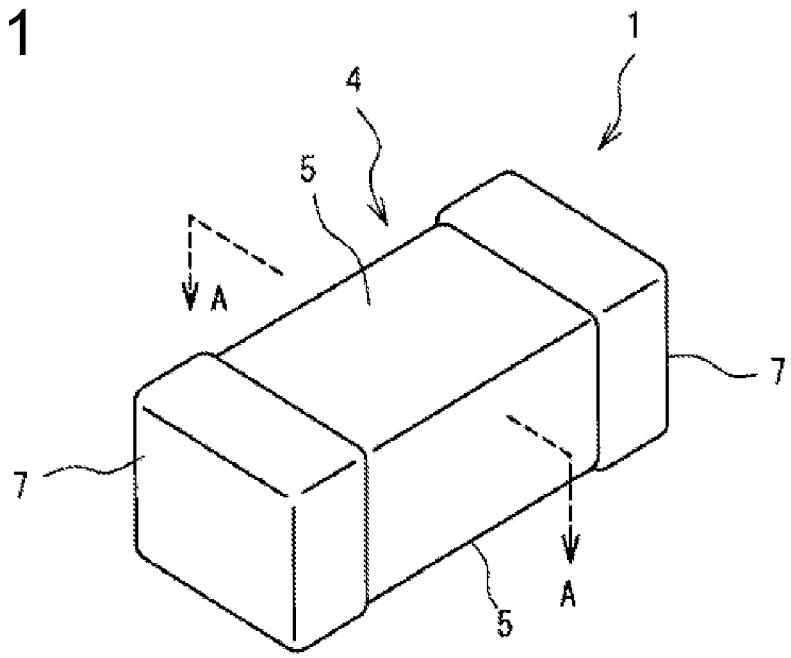
FIG. 1 is a schematic perspective view of a multi-layer ceramic capacitor according to a preferred embodiment of the present invention.
Figure 2:
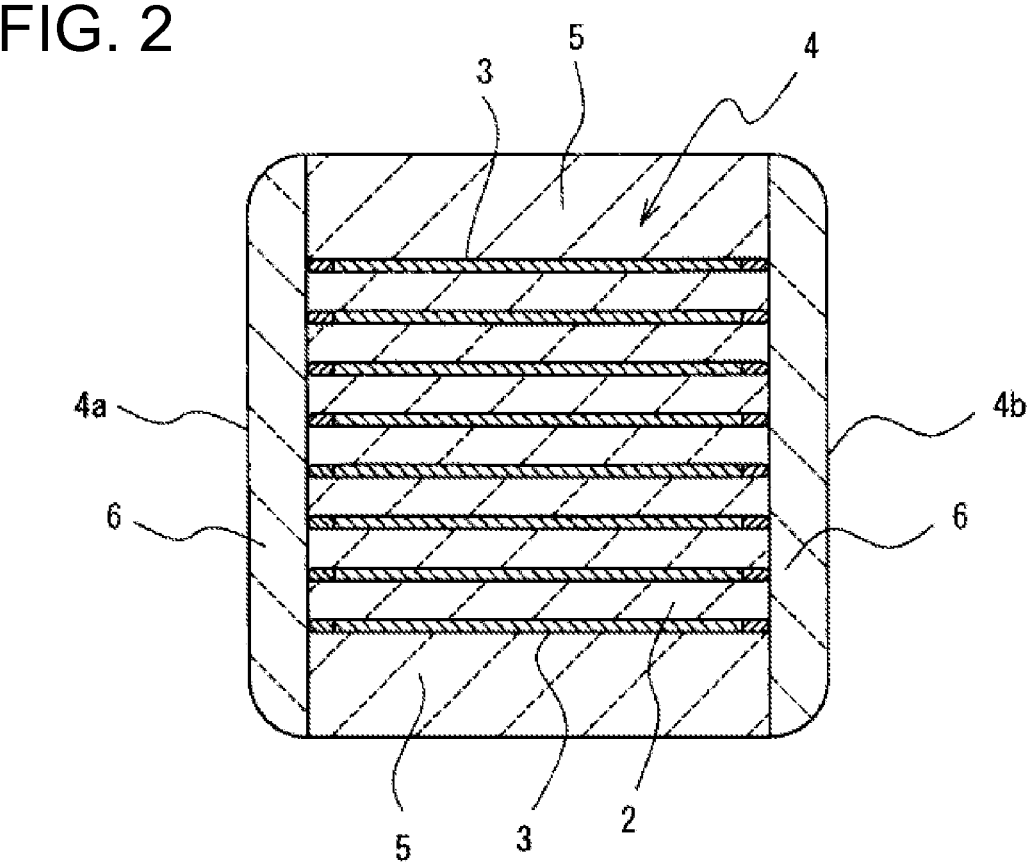
FIG. 2 is a schematic vertical cross-sectional view along the line A-A in the multi-layer ceramic capacitor according to the preferred embodiment of the present invention shown in FIG. 1.

FIG. 1 is a schematic perspective view of a multi-layer ceramic capacitor according to a first preferred embodiment of the present invention. FIG. 2 is a schematic vertical cross-sectional view along the line A-A in the multi-layer ceramic capacitor shown in FIG. 1.

As shown in FIGS. 1 and 2, a multi-layer ceramic capacitor 1 includes a laminated block 4 formed by laminating ceramic dielectric layers 2 and internal electrode layers 3 alternately, a pair of cover layers 5, 5 that are laminated on top and bottom of the laminated block 4, ceramic bodies 6 that are referred to as "side margins" and that are formed on both side surfaces of the laminated block 4, and a pair of external electrodes 7, 7 electrically connected to the internal electrode layers 3.

As shown in FIG. 2, the internal electrode layers 3 extended in the horizontal direction of the multi-layer ceramic capacitor 1 are not exposed to side surfaces 4a and 4b of the multi-layer ceramic capacitor 1, and between the respective end portions of the internal electrode layers 3 near the side surfaces and the side surfaces 4a and 4b of the multi-layer ceramic capacitor 1, the ceramic bodies 6 are provided, respectively.

The multi-layer ceramic capacitor 1 having such a configuration can be manufactured in a manner described below, for example.

First, a ceramic green sheet formed of a dielectric material mainly made of $BaTiO_3$, a conductive paste for forming the internal electrodes, a conductive paste for forming the external electrodes, and a dielectric paste for forming the ceramic bodies are prepared. The dielectric paste and the conductive pastes include a binder and a solvent. As such binder and solvent, known binders and solvents can be used. The conductive paste for forming the external electrodes may include a glass component.

In this embodiment, the conductive paste for forming the internal electrodes includes nickel as a main component, and $BaTiO_3$ having the average grain size of less than 100 nm is added thereto as an additive. As $BaTiO_3$ added as the additive, a material having the same composition as that of a dielectric material included in the ceramic green sheet or the dielectric paste can be suitably used. The average grain size was measured by the laser diffraction method.

As the dielectric paste for forming the ceramic body 6, a dielectric material that is mainly made of $BaTiO_3$ and that has a higher glass component content such as $SiO_2$ as compared with the ceramic dielectric layer 2 that constitutes the laminated block 4 is used. The glass component included in the ceramic dielectric layer 2 and the ceramic body 6 promotes sintering of the ceramic dielectric layer 2 and the ceramic body 6. Other than $SiO_2$, boron or lithium can be included as the glass component.

Next, by a known printing method such as a screen printing method, the conductive paste for forming the internal electrode is applied on the ceramic green sheet, and a pattern that becomes the internal electrode layer 3 is therefore formed.

Next, a plurality of ceramic green sheets not having the pattern of the internal electrode layer 3 are laminated to form a cover layer for the bottom side, and on the cover layer, a plurality of ceramic green sheets having the pattern of the internal electrode layer 3 are laminated. Further, a plurality of ceramic green sheets not having the pattern of the internal electrode layer 3 are laminated thereon to form a cover layer for the top side. As a result, an unfired laminated mother body is formed. Next, the unfired laminated mother body is pressed in the laminated direction by a hydrostatic press or the like so as to be pressure-bonded.

Thereafter, the unfired laminated mother body is cut to a prescribe size, thereby forming an unfired ceramic laminate.

Further, the ceramic bodies 6 are formed by applying the dielectric paste on side surfaces of the ceramic laminate.

The unfired ceramic laminate prepared in the manner described above undergoes a binder removal process, and is thereafter fired at a temperature of about 1200° C. When the internal electrodes are made of base metal such as Ni, the firing process is performed under a reducing atmosphere. After the firing process, the conductive paste for forming the external electrode is applied to the end surfaces where the internal electrodes are exposed, and by performing a baking process, the external electrodes are formed. Plating is performed for the external electrodes if necessary.

In the firing process, when the atmosphere temperature is increased, $BaTiO_3$ is released from the internal electrode layers 3 while liquid phase is formed in the ceramic bodies. Because the ceramic bodies have the higher glass component content as compared with the ceramic laminate, liquid phase is more likely to occur in the ceramic bodies at a lower temperature as compared with the ceramic laminate.

As a result, $BaTiO_3$ that has been released from the internal electrode layers 3 reacts with the liquid phase that has been formed in the ceramic bodies, thereby forming the silicate crystal made of an oxide including Ba and Si or an oxide including Ti and Si, which is represented by $Ba_2TiSi_2O_7$, for example, in the boundary portions between the ceramic laminate and the ceramic bodies 6. This strengthens the adhesion between the ceramic laminate and the ceramic bodies 6, and an occurrence of a crack in the multi-layer ceramic capacitor 1 can therefore be effectively prevented.

Figure 3:
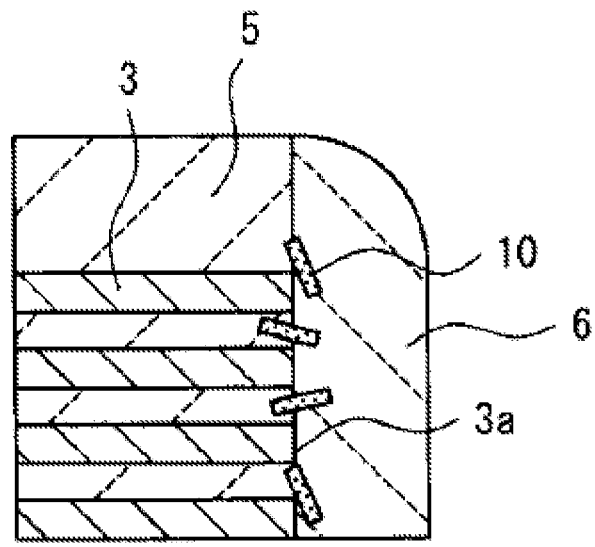
FIG. 3 is a schematic cross-sectional view showing an area near an end surface of a multi-layer ceramic capacitor according to a preferred embodiment of the present invention.

FIG. 3 is a schematic cross-sectional view showing an area near an end surface of the multi-layer ceramic capacitor 1 that went through the above-mentioned firing process.

As shown in FIG. 3, silicate crystals 10 are precipitated in an end portion 3a of the internal electrodes 3 near the side surface in the multi-layer ceramic capacitor 1 of this embodiment.

When the multi-layer ceramic capacitor 1 is attached to a substrate by the reflow soldering, it is placed in a high-temperature atmosphere for several minutes. That is, the multi-layer ceramic capacitor 1 is kept in a high-temperature environment that exceeds 275° C., for example, and therefore, a thermal shock may occur in the multi-layer ceramic capacitor 1. However, according to this embodiment, the silicate crystals 10 made of an oxide including Ba and Si or an oxide including Ti and Si such as $Ba_2TiSi_2O_7$ are formed between the ceramic laminate and the ceramic body 6, and the adhesion between the ceramic laminate and the ceramic body 6 has been therefore improved. This makes it possible to effectively prevent cracking in the multi-layer ceramic capacitor 1 even when it undergoes the thermal shock.

Figure 4:
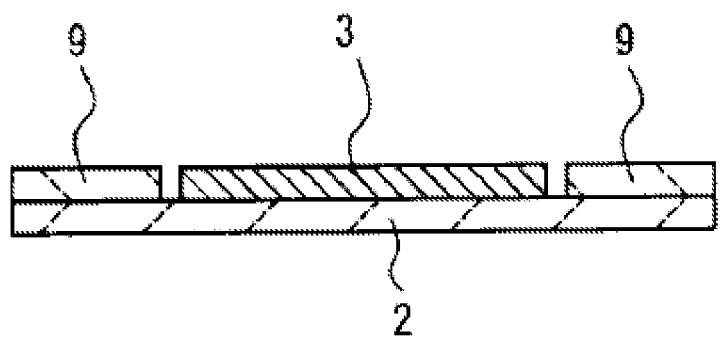
FIG. 4 is a schematic cross-sectional view of a ceramic green sheet and an internal electrode layer formed on the ceramic green sheet in a manufacturing process of a multi-layer ceramic capacitor according to a second preferred embodiment of the present invention.

FIG. 4 is a schematic cross-sectional view of a ceramic green sheet and an internal electrode layer formed on the ceramic green sheet in a manufacturing process of a multi-layer ceramic capacitor according to a second preferred embodiment of the present invention.

As shown in FIG. 4, on a surface of a ceramic green sheet 2, an internal electrode layer 3 including nickel is formed by printing a conductive paste that includes nickel. On the other hand, on a surface of the ceramic green sheet 2 where the internal electrode layer 3 is not formed, a step filling layer 9 is formed in a pattern that complements the pattern of the internal electrode layer 3 so as to fill a step caused by the thickness of the internal electrode layer 3.

In this embodiment as well, the conductive paste for forming the internal electrode includes nickel as a main component, and $BaTiO_3$ having the average grain size of less than 100 nm is added thereto as an additive.

As dielectric paste for forming the step filling layer 9, a dielectric material contains more glass component such as $SiO_2$ as compared with glass component content in a dielectric that forms the ceramic dielectric layer is used.

By laminating and pressure-bonding a plurality of ceramic green sheets respectively having the internal electrode layers 3 and the step filling layers 9 formed on the surfaces thereof as shown in FIG. 4, a ceramic laminate is fabricated. Ceramic bodies are formed by applying dielectric paste to a pair of side surfaces of the ceramic laminate.

In a firing process, when an atmosphere temperature is increased, $BaTiO_3$ is released from the internal electrode layers 3 while liquid phase is formed in the ceramic bodies.

As result, $BaTiO_3$ that has been released from the internal electrode layers 3 reacts with the liquid phase that has been formed in the ceramic bodies, thereby forming the silicate crystals 10 made of an oxide including Ba and Si or an oxide including Ti and Si, such as $Ba_2TiSi_2O_7$, for example, in boundary portions between the ceramic laminate and the ceramic bodies 6. This strengthens the adhesion between the ceramic laminate and the ceramic bodies 6, and an occurrence of a crack in the multi-layer ceramic capacitor 1 can therefore be effectively prevented.

When the multi-layer ceramic capacitor 1 is attached to a substrate by the reflow soldering, it is placed in a high-temperature atmosphere for several minutes. That is, the multi-layer ceramic capacitor 1 is kept in a high-temperature environment that exceeds about 275° C., and therefore, a thermal shock may occur in the multi-layer ceramic capacitor 1. However, according to this embodiment, the silicate crystals made of an oxide including Ba and Si or an oxide including Ti and Si, which is represented by $Ba_2TiSi_2O_7$, for example, are formed between the ceramic laminate and the ceramic bodies 6, and the adhesion between the ceramic laminate and the ceramic bodies 6 has been therefore improved. This makes it possible to effectively prevent cracking in the multi-layer ceramic capacitor 1 even when it undergoes the thermal shock.

Further, according to this embodiment, the step filling layer 9 is formed on the ceramic green sheet 12 in a pattern that complements the pattern of the internal electrode layer 13 that is formed on the surface of the ceramic green sheet 12. This prevents formation of a step between the surface of the internal electrode layer and the surface of the ceramic green sheet where the internal electrode layer is not formed. Therefore, deformation of a multi-layer ceramic capacitor formed by laminating a plurality of laminated body units that respectively include a ceramic green sheet and an electrode layer can be effectively prevented. It also makes it possible to effectively prevent an occurrence of delamination.

The present invention is not limited to the above-mentioned embodiments, and various modifications can be made without departing from the scope of the present invention described in claims. It is apparent that those modifications are also included in the scope of the present invention.

In the first embodiment above, for example, the external electrodes were formed by coating and baking a conductive paste after the firing process of the ceramic laminate, but the external electrodes may also be formed simultaneously in the firing process of the ceramic laminate by coating an unfired ceramic laminate with the conductive paste.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

The invention claimed is:

1. A multi-layer ceramic capacitor, comprising:
   a laminated block formed by laminating ceramic dielectric layers and internal electrodes alternately;
   a pair of cover layers laminated on top and bottom of the laminated block;
   a ceramic body formed on both side surfaces of the laminated block; and
   a pair of external electrodes electrically connected to the internal electrodes,
   wherein a silicate crystal made of an oxide including Ba and Si or a silicate crystal made of an oxide including Ti and Si is formed in a boundary portion between the laminated block and the ceramic body.

2. The multi-layer ceramic capacitor according to claim 1, wherein the silicate crystal made of an oxide including Ba and Si or the silicate crystal made of an oxide including Ti and Si is $Ba_2TiSi_2O_7$.

3. The multi-layer ceramic capacitor according to claim 1, wherein an average grain size of $BaTiO_3$ that is added to a conductive paste for the internal electrodes including nickel is less than 100 nm.

4. The multi-layer ceramic capacitor according to claim 1, wherein a glass component content in a dielectric that forms the ceramic body is higher than a glass component content in a dielectric that forms the ceramic dielectric layers.

* * * * *